United States Patent
Treleaven et al.

(10) Patent No.: US 9,590,973 B2
(45) Date of Patent: *Mar. 7, 2017

(54) METHODS FOR FRAUD DETECTION

(71) Applicant: FMR LLC, Boston, MA (US)

(72) Inventors: Philip Treleaven, Boston, MA (US);
Leo I. Unger, Newton, MA (US);
Carolyn Manis Sorensen, Salt Lake City, UT (US); Qing Wu, Acton, MA (US); Richard Cehon, Leicester, MA (US)

(73) Assignee: FMR LLC, Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/710,221

(22) Filed: May 12, 2015

(65) Prior Publication Data

US 2016/0164861 A1   Jun. 9, 2016

Related U.S. Application Data

(63) Continuation of application No. 14/564,025, filed on Dec. 8, 2014, now Pat. No. 9,059,985.

(51) Int. Cl.
*H04L 29/06* (2006.01)

(52) U.S. Cl.
CPC .......... *H04L 63/0815* (2013.01); *H04L 63/08* (2013.01); *H04L 63/10* (2013.01); *H04L 63/102* (2013.01); *H04L 63/12* (2013.01); *H04L 63/123* (2013.01); *H04L 63/1483* (2013.01); *H04L 63/168* (2013.01)

(58) Field of Classification Search
USPC ...................................................... 726/8, 10
See application file for complete search history.

(56) References Cited

U.S. PATENT DOCUMENTS

| | | | |
|---|---|---|---|
| 7,185,364 B2 | 2/2007 | Knouse et al. | |
| 7,908,649 B1 | 3/2011 | Arora et al. | |
| 8,418,238 B2 * | 4/2013 | Platt | H04L 63/0815 726/1 |
| 8,707,451 B2 | 4/2014 | Ture et al. | |
| 8,959,650 B1 | 2/2015 | Richards et al. | |
| 2003/0105981 A1 | 6/2003 | Miller et al. | |
| 2005/0114666 A1* | 5/2005 | Sudia | 713/175 |
| 2006/0036875 A1 | 2/2006 | Karoubi | |
| 2009/0133110 A1* | 5/2009 | Kumar et al. | 726/8 |
| 2009/0319776 A1 | 12/2009 | Burch et al. | |
| 2010/0174900 A1 | 7/2010 | Lin | |
| 2015/0067804 A1 | 3/2015 | Maxwell | |

* cited by examiner

*Primary Examiner* — Jason Lee
(74) *Attorney, Agent, or Firm* — Proskauer Rose LLP

(57) ABSTRACT

Method and systems for validating a client user in a secured network are provided. Upon authentication, a user is supplied a login cookie that includes verification data. When requesting access to a secured resource, the verification data is compared to the data in the request to confirm that the requestor is a legitimate user and not a user who has stolen the login cookie.

11 Claims, 6 Drawing Sheets

METHODS FOR FRAUD DETECTION

CROSS REFERENCE TO RELATED APPLICATIONS

This application is a continuation of U.S. Ser. No. 14/564,025 filed on Dec. 8, 2014, which is owned by the assignee of the instant application and the entire disclosure of which is incorporated herein by reference

FIELD OF THE INVENTION

The invention relates generally to computer-based methods for fraud detection. More specifically, validation data is added to login credentials to allow policy enforcement points to determine if a user's characteristics change unexpectedly as an indicator of potential fraud.

BACKGROUND

Many online applications are required to provide confidential information to their users and require a high degree of confidence that the user is actually entitled to receive back the confidential information. For example, for investment firms that provide investment information to users over the internet, it is crucial to know that the user is actually entitled to confidential financial information.

When a user goes to a URL via a web browser to log into an online domain (e.g., an application), the user is typically presented a request to enter login credentials (e.g., a user name, a password and/or user defined answers to questions). The login credentials can be sent to a server, validated, and then the server can transmit a login cookie that includes the user's login credentials back to the user's computer. The user's browser stores the cookie, and presents the login cookie when the user requests access to resources within the domain that created the login cookie. During the user's session, each time the user requests access to a protected resource, the login cookie is presented to an access point of the protected resource. The access point ensures that the user is authorized to gain access to the protected resource by checking the login credentials in the cookie.

An illegitimate user looking to gain access to the protected resource and protected information associated with the user can hack into the user's session and steel the user's login cookie. Once the illegitimate user has the user's login cookie, the illegitimate user can use the login cookie to obtain all of the information and enter all protected resources that the legitimate user has access to.

Login cookies can be stolen by illegitimate users (e.g., hackers, attackers, and/or malicious insiders) in a variety of ways. Illegitimate users having access to any server operating within a particular login domain can gain access to the cookies being sent to servers within the login domain. The servers can include servers internal to the login domain and/or servers hosted by a third party included in the domain. Many third party hosted servers within the login domain and/or servers hosting client customizable sites within the login domain can have lower levels of security assurance then servers internal of the login domain For example, hackers can user cross-site scripting. When present on a website, the hacker can take advantage of the cross-site scripting by sending a maliciously constructed spam email to entice a user to click on the email. When the user clicks on the email, its contents execute inside the user's browser to transmit the user's login cookie to the hacker.

In other example, hackers can use third party sites that interact with the protected resources, user sites that are customized for a particular customer, impersonate protected resources, and/or enter a mix of secured/non-secure content where some sites are not enabled on SSL where attacks could be launched with tools like SSL strip to gain access to protected resources.

One current method of preventing stealing of login cookies involves increasing security of sites that receive cookies. However, for domains that require transmission of cookies to sites outside of the domain's control (e.g., sites are hosted by third-parties, or when permissions are granted to clients to update the sites) it can be difficult to implement increased security.

Another current method of preventing stealing of cookies is to ensure that pages sent to clients do not present opportunities for exploitation. However, this method can be impractical as new exploits are typically discovered by attackers every day and the amount of pages normally needed in support any site makes it difficult to stay ahead of attackers.

Another current method of preventing stealing of cookies is to ensure that all clients run security software to prevent malicious software from being installed on their equipment. However, it can be very difficult to mandate and ensure that all client users have the security software installed and running and even if the security software is running there is no guarantee that the security software catches all Trojans before they are installed.

Another current method of preventing stealing cookies is to educate customers not to click links in dubious e-mails and/or visit dubious sites. It can be very difficult to reliably train clients/customer to avoid these situations.

Another current method of preventing stealing of cookies is to set the timeout value low enough to be effective against attackers, but not to inhibit real customers from conducting their business.

Therefore, it is desirable to prevent cookies from being stolen in a manner that requires no change to the client device, no training of the user, and/or other impacts to the client device. It is desirable to prevent cookies from being stolen in a manner that has minimal impacts on access points of the protected resources. It is also desirable to provide continuous validation that the user issued the login cookie at the initial logon is the same user presenting the cookie on subsequent requests.

SUMMARY OF THE INVENTION

One advantage of the claimed invention is that it provides continuous validation that the user issued the login cookie at the initial logon is the same user presenting the cookie on subsequent requests. Another advantage of the invention includes identifying when a request to a protected resource is from an illegitimate user who has stolen a cookie presented to the protected resource from a legitimate user. Another advantage of the claimed invention is that it imposes minimal impact at an access point of each of the protected resources due to the checking done at the access point being minimal. The checking imposes minimal or no delays, imposes minimal or no increases to the demands on the access points CPU, and/or once deployed the checking can be augmented without updating the access point software and/or its configuration in each of the application sites.

Another advantage of the invention is that is reduces overall cost of preventing hacking due to allowing business hosting domains to more widely use cheaper services hosted in third-party sites.

Another advantage of the invention is that is replaces/simplifies some of the work typically performed by fraud monitoring teams. Another advantage includes speeding up the response time of fraud monitoring systems due to alerting of those teams when anomalous activity is detected by the solution.

Another advantage of the invention is that a continuous ongoing verification of the user is provided without a user having to go through the entire login process due to a layered check during access requests.

Other advantages include reduction in the costs attributed to fraud and reduction in risks to companies business, due to reduction of fraudulent activity.

In one aspect, the invention involves a computerized-method of validating a client user in a secured network. The method also involves receiving, by a first server computing device, a first request from a client to login to a protected domain of the first server, the first request including user login credentials and a first set of verification data, the first set of verification data recorded by the client at the time the login credentials were entered. The method also involves determining, by the first server computing device, whether the login credentials are recognized. The method also involves transmitting, by the first server computing device, a first cookie to the client, the first cookie including the login credentials and a second set of verification data, the second set of verification is a subset or derived from the first set of verification data. The method also involves transmitting, by the first server computing device, a second cookie to the client, the second cookie including a third set of verification data that is sufficient to confirm the first cookie.

In some embodiments, the method involves receiving, by a second server computing device, a request to gain access to a protected resource of the protected domain, the second request including the first cookie and a fourth set of verification data, and determining, by the server computing device, whether the request was transmitted by the client associated with the first cookie based on the first cookie and the fourth set of verification data. If the request was transmitted by the client associated with the first cookie, allowing access to the protected resource of the protected domain and if the request was not transmitted by the client associated with the first cookie, denying access to the protected resource of the protected domain or redirect the user to reenter login credentials.

In some embodiments, determining whether the request was transmitted by the client associated with the first cookie involves determining, by the second server computing device, whether a first IP address included in the second set of verification data in the cookie is equal to a second IP address included in the fourth set of verification data transmitted with the second request.

In some embodiments, determining whether the request was transmitted by the client associated with the first cookie involves determining, by the first server computing device, a first value to include in the first cookie, the first value is determined by performing a cryptographic hash on the at least a portion of the second set of verification data, determining, by the second server, a second value, the second value is determined by performing a cryptographic hash on a subset of the fourth set of verification data, the subset of the fourth set of verification data based on fields present in the second set of verification data, and comparing, by the second server, the first value and the second value.

In some embodiments, determining whether the request was transmitted by the client associated with the first cookie involves determining, by the second server computing device, whether the first cookie passes a first level review and if the first cookie does not pass a first level review, then determining, by the first server computing device, whether the first cookie passes a second level review.

In some embodiments, the first level review involves determining, by the second server computing device, whether a first IP included in the second set of verification data is equal to a second IP address included in the fourth set of verification data, and the second level review involves performing, by the first server computing device, a risk based analysis based on the subset of the first set of verification data in the first cookie and the fourth set of verification data, and determining, by the first server computing device, whether the output of the risk based analysis is sufficient to allow access to the requestor.

In some embodiments, the first level review comprises determining, by the second server computing device, whether a first IP included in the second set of verification data is equal to a second IP address included in the fourth set of verification data, and the second level review involves determining, by the first server computing device, a first value to include in the first cookie, the first value is determined by performing a cryptographic hash on a at least a portion of the second set of verification data, determining, by the first server computing device, a second value, the second value is determined by performing a cryptographic hash on at least a portion of the third set of verification data in the second cookie, and determining, by the first server, the first value and the second value are equal.

In some embodiments, the first level review involves determining, by the first server computing device, whether a first location included in the second set of verification data is equal to a second location included in the fourth set of verification data. In some embodiments, the first level review involves determining, by the second server computing device, a time lapse between the second set of verification data and the fourth set of verification data.

In some embodiments, the second set of verification data is derived by performing a cryptographic hash on at least a portion of the first set of verification data. In some embodiments, the fields included from the first set of verification in the second set of verification data are specified in a file.

In some embodiments, the second set of verification data includes IP address, user agent, screen size, available fonts, software version, or any combination thereof. In some embodiments, the third set of verification data includes an encryption key and the first set of verification data encrypted with the encryption key. In some embodiments, the fourth set of verification data is based on an indicator in the first cookie, the indicator specifies data fields that are present in the second set of verification data. In some embodiments, the fourth set of verification data includes IP address, user agent, screen size, available fonts, software version, or any combination thereof.

BRIEF DESCRIPTION OF THE DRAWINGS

The foregoing and other objects, features, and advantages of the present invention, as well as the invention itself, will be more fully understood from the following description of various embodiments, when read together with the accompanying drawings.

DETAILED DESCRIPTION

Generally, a user requests to log into a protected domain via a client computing device. The user is directed to a first server computing device of the domain (e.g., login server). The login server computing device transmits to the client computing device a request for login credentials (e.g., user name, password, and/or other uniquely identifying information). The login credentials are input by the user and transmitted by the client computing device to the login server computing device. The login server computing device attempts to verify the login credentials. If the login credentials pass, the login server computing device creates a first cookie (e.g., a login cookie) and a second cookie (e.g., a limited-distribution cookie) and transmits the first and second cookies to the client computing device.

The login cookie includes the login credentials and determines verification data from data that was transmitted in the request from the client computing device. For example, when transmitting requests via a web browser, the HTTP and/or HTTPS headers include data that is unique to the client computing device and/or the request (e.g., IP address, geographic location, transmission time, etc. . . . ).

The limited-distribution cookie includes data that is sufficient to confirm the login cookie, if necessary.

With each subsequent request to protected resources within the domain, the login cookie is presented to the protected resource. Each protected resource of the domain checks the login cookie to ensure that the user that entered the login credentials is the sender of the request for access to the protected resource. Each protected resource compares the verification data in the cookie against HTTP and/or network data transmitted with each request to determine whether each subsequent request is from the client computing device or whether the login cookie has been stolen and the request is from an illegitimate user.

Figure 1:
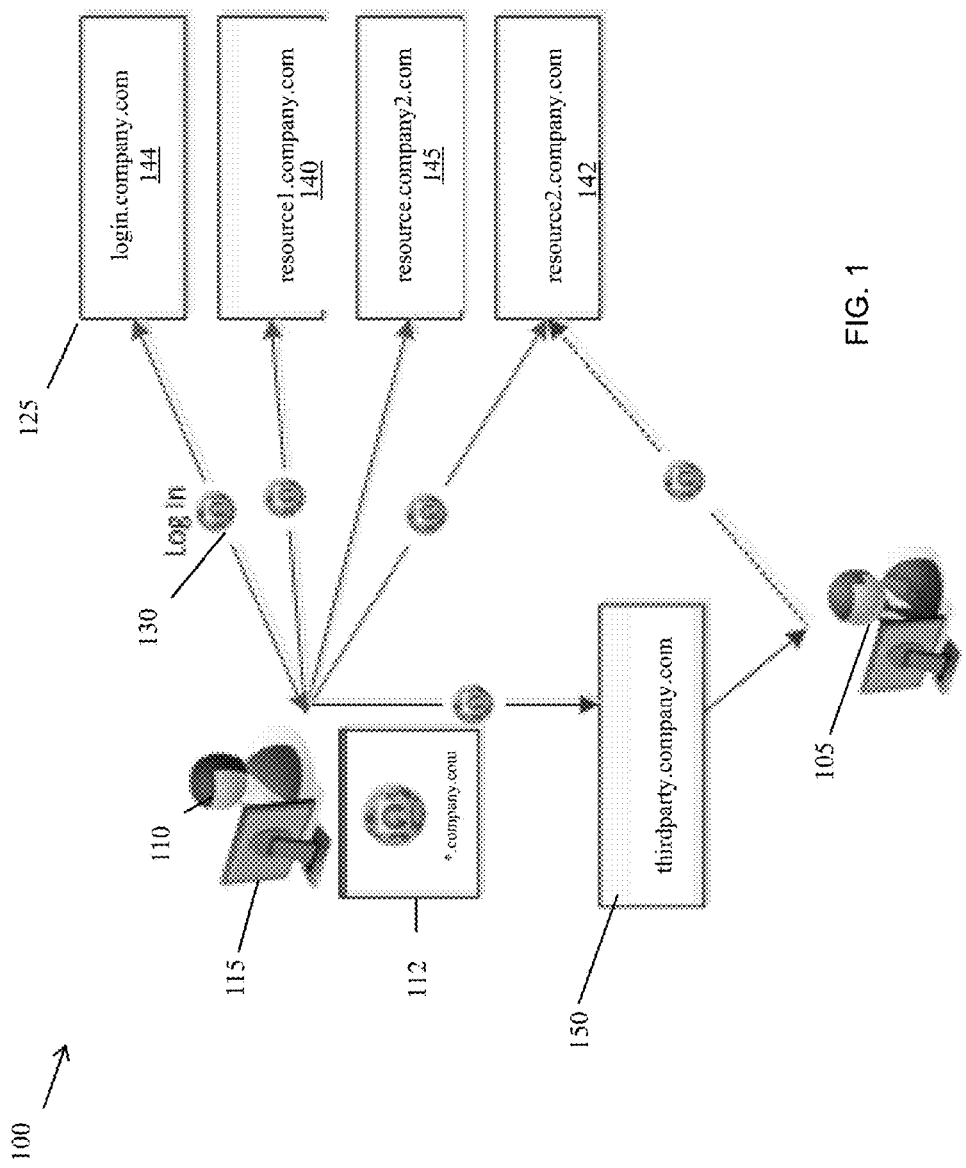
FIG. 1 is a schematic diagram illustrating a scenario where an illegitimate user steals a legitimate user's login cookie, according to the prior art.

FIG. 1 is a schematic diagram 100 illustrating a scenario where an illegitimate user 105 steals a legitimate user's login cookie 130, according to the prior art. A legitimate user 110 uses a web browser 112 executed on a computing device 115 (e.g., client computing device) to log into server 144 within a first domain (e.g., company.com).

The legitimate user 110 supplies login credentials (e.g., user name, password, and/or other uniquely identifying factors) to the login server 144 via the web browser 112 and the computing device 115. To simplify the discussion, going forward when it is said that data is transmitted from/to the computing device 115 it is to be understood that data entered into the computing device 115 enters via the web browser 112 and data presented to the user is via the web browser 112.

The server 144 verifies that the login credentials are correct and returns a login cookie 130 including the login credentials to the legitimate user 110 via the computing device 115. Each time the legitimate user 110 attempts to access a protected resource within the first domain (e.g., first protected resource 140 and second protected resource 142) the computing device 115 transmits the login cookie 130 to the first protected resource 140 or the second protected resource 142, respective to the request, and the respective protected resource, first protected resource 140 or the second protected resource 142, verifies that the login cookie 130 has the required login credentials. It is understood by one of ordinary skill in the art that the first protected resource 140 and/or the second protected resource 142 are hosted on servers, respectively.

When the illegitimate user 105 steals the legitimate user's login cookie 130 from a third server 150 that operates within the first domain, the illegitimate user 105 transmits the login cookie 130 to the first protected resource 142 to gain access. When the login cookie 130 is presented to the first protected resource 142 via the illegitimate user 105, the first protected resource 142 checks the login cookie 130 for login credentials and verifies that they are correct. The first protected resource 142 has no mechanism to determine that the login cookie 130 was stolen and allows the illegitimate user 105 access to the protected resource 142. In this manner, an illegitimate user can gain access to protected resources.

It is apparent to one of ordinary skill in the art that the protected resources 144, 140, 145, and 142 can each be separate server computing devices, virtual servers on a single server computing device or any combination thereof.

Figure 2:
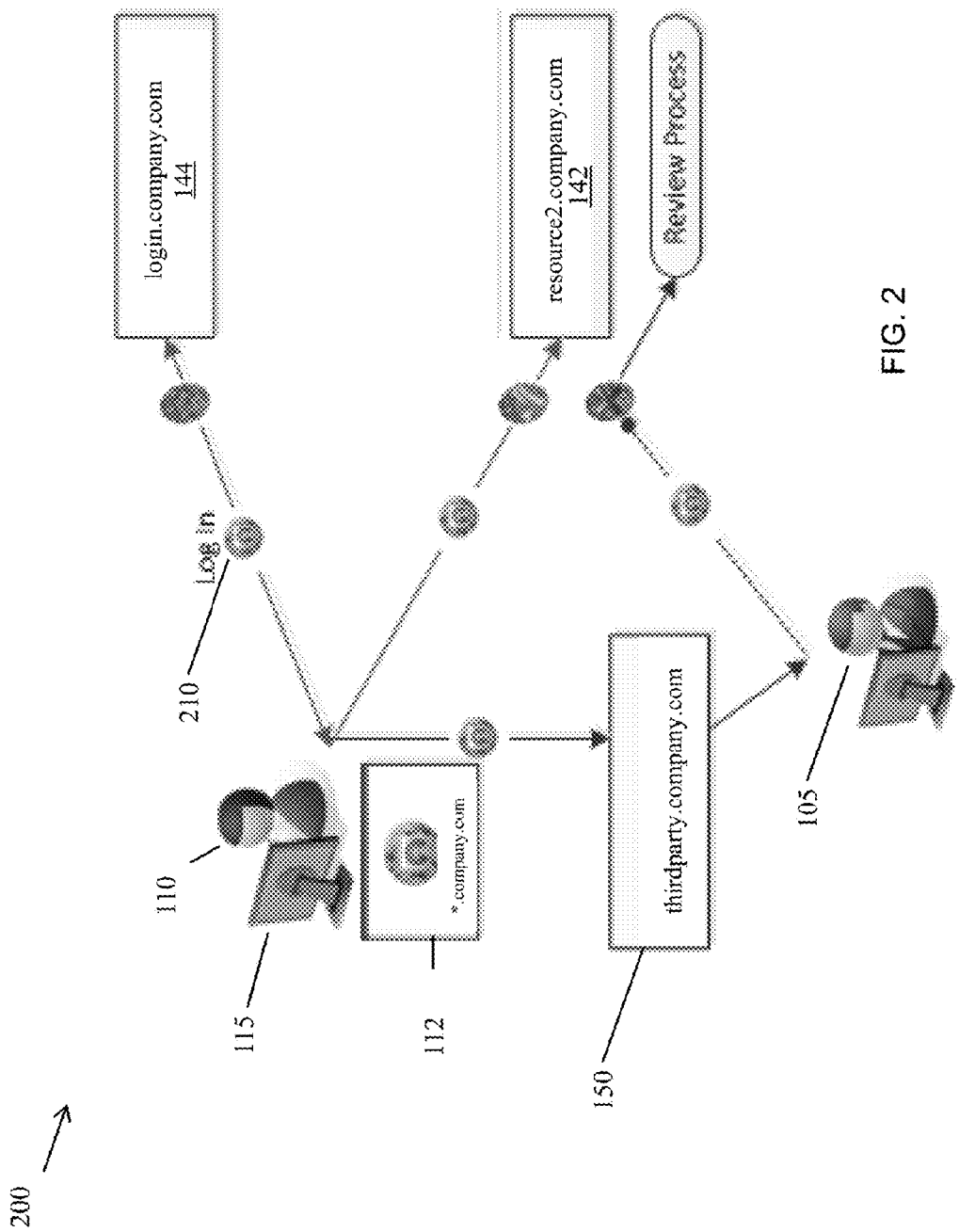
FIG. 2 is a schematic diagram illustrating a scenario where an illegitimate user is prevented from stealing a legitimate user's login cookie, according to an illustrative embodiment of the invention.

FIG. 2 is a schematic diagram 200 illustrating a scenario where the illegitimate user 105 is prevented from stealing a legitimate user's login cookie 120, according to an illustrative embodiment of the invention.

In the scenario of FIG. 2, the server 144 creates a login cookie 210 that includes not only the user supplied login credentials, but also includes verification data. The verification data can be from the header of the HTTP request, the network and/or a device print received with the request for access (e.g., IP address, user-agent header, screen size, available fonts, software version, MAC address, request latency, other network characteristics, or any combination thereof). In some embodiments, the verification data includes a device print (e.g., screen-size, fonts, software versions, or any combination thereof). The server 144 also creates a limited-distribution cookie (not shown). The limited-distribution cookie includes data sufficient to confirm the login cookie 210.

In this scenario, when the illegitimate user 105 steals the login cookie 210 from the legitimate user 110 and transmits the login cookie 210 to the protected resource 142 to gain access, the server protected resource 142 can detect that the presenter of the login cookie 210 is may not be a legitimate user. Every time the domain receives a request for access to the protected resources 140 and 142, each protected resource 140 and 142, respectively, determines whether the sender is the legitimate user 110 based on the verification data in the login cookie 210 and data that are sent in the current access request. For example, the protected resource 140 can check that the IP address in the verification data in the login cookie 210 matches the IP address in the current access request.

If checks performed by the protected resources 140 and 142, respectively, fail a second level of review can be performed. The limited-distribution cookie and the login cookie 210 can be transmitted to the login server 144 for further review. The login server 144 can compare information in the cookie 210 against information in the limited-distribution cookie to determine if it is more likely than not that the requestor is not a legitimate user. The login server 144 can also perform risk based analysis to determine if it is more likely than not that the requestor is not a legitimate user. In this manner, and others described below, the protected resources of a domain can verify that the sender of the login cookie 210 is the legitimate user 110 that is allowed to gain access to the protected resource 142 within the domain.

Figure 3:
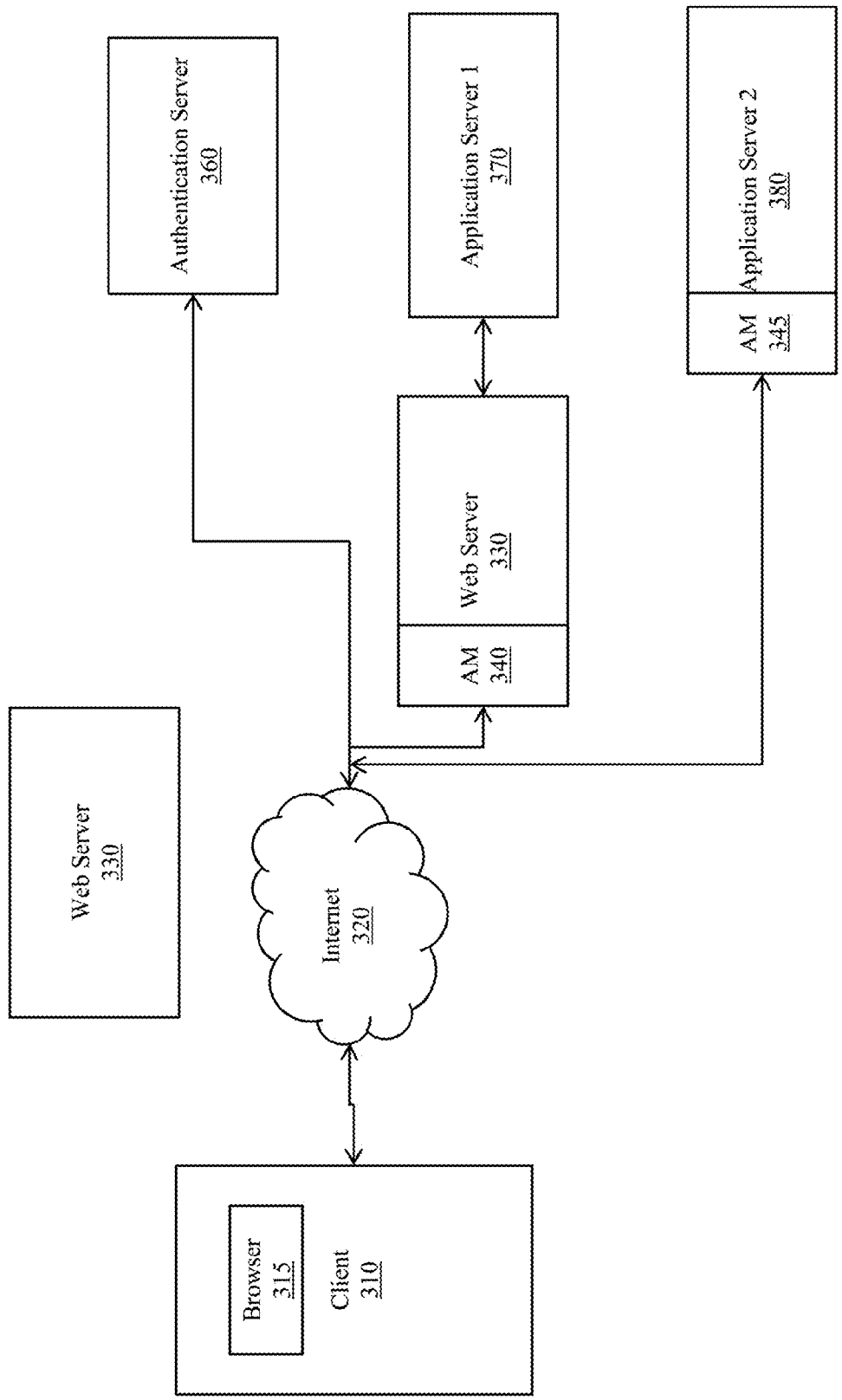
FIG. 3 is a system diagram of a system that allows for validation of a client user in a secured network, according to an illustrative embodiment of the invention.

FIG. 3 is a system diagram of a system 300 that allows for validation of a client user in a secured network, according to an illustrative embodiment of the invention. The system 300 includes a client computing device 310, the internet 320, a web server 330, an first authentication monitor 340, an authentication server 360, a first application server 360, a second authentication monitor 345, and a second application server 370. The client computing device 310 includes a web browser 315.

The client computing device 310 is in wired and/or wireless communication with the internet 320. The internet 320 is in wired and/or wireless communication with the web server 330, the authentication server 360 and the application server 380. The web server 330 is in wired and/or wireless communication with the application server 370. For each of the components in wired and/or wireless communication, messages can be transmitted via local networks between the components and/or over the internet (e.g., the World Wide Web). It is apparent of one of ordinary skill in the art that the web server 330, authentication server 370, first application server 360 and the second application server 370 can exists on one or more computing devices in various communication and hardware configurations as is currently known in the art.

During operation, a user instructs the client computing device 310 to transmit a request for access to a protected domain via the web browser 315. The client computing device 310 transmits the request via the internet 320 to the authentication server 360. The authentication server 360 transmits a login web page via the internet 320 to the client computing device 310. The client computing device 310 presents the login web page to the user via the browser 315.

The user enters the login credentials into the login webpage via the browser 315. The client computing device 310 transmits the login credentials via the internet 320 to the authentication server 360. The authentication server 360 authenticates the login credentials and creates a first cookie (e.g., login cookie) and a second cookie (e.g., limited-distribution cookie). The login cookie includes the login credentials and data that are included with the request for access (e.g., HTTP header data). The limited-distribution cookie includes data sufficient to confirm the login cookie. The data in both the first and second cookies can be referred to as verification data.

The login cookie and the limited-distribution cookie are transmitted to the client computing device 310 via the internet 320. The client computing device 310 stores the login cookie and the limited-distribution cookie.

The user inputs to the client computing device 310 via the web browser 315 a request to access to a protected resource of the protected domain, the first application server 370 that is within the domain of the authentication server 360. The client computing device 310 transmits the request and the login cookie to the web server 330 via the internet 320. The web server 330 attempts to transmit the request to the first application server 370 and is intercepted by the authentication monitor 340.

The authentication monitor 340 validates the login cookie by verifying the login credentials and verifying the validation data. The validation data is verified by comparing the validation data against data that is transmitted with the request. The comparisons are discussed in further detail below.

If the authentication monitor 340 validates the login cookie, access to the first application server 370 is allowed. If the authentication monitor 340 does not validate the login cookie, the authentication monitor 340 redirects a message to the browser 315 via the internet 320 that instructs the browser 315 to return to the authentication server 360 for a second level review (e.g., deep analysis).

The browser 315 transmits via the internet, the login cookie and the limited-distribution cookie to the authentication server 360. The authentication server 360 checks that the limited-distribution cookie is present. If the login cookie was stolen and the authentication monitor 340 directs the browser 315 of the legitimate user to transmit the login cookie and the limited-distribution cookie to the authentication server 360, the client computing device 310 likely does not even have a limited-distribution cookie to transmit. Thus, if the limited-distribution cookie is not present, then the authentication server 360 denies access to the protected resource, transmits a login page to the client computing device 310 via the internet 320, requests additional challenge data (e.g., presents security questions and/or perform step up authentication), or any combination thereof.

The authentication server 360 checks that the login cookie is valid, the authentication For example, when creating the limited-distribution cookie, a Hash-Based Message Authentication Code (HMAC) can be created based on a secret-key stored included in the limited-distribution cookie. The authentication server 360 can create a new HMAC based on the secret-key and the login cookie. The authentication server can compare the HMAC of the limited-distribution cookie against the new HMAC of the login cookie. If the HMAC of the host domain and the new HMAC are equivalent then the login cookie is valid. If the HMAC of the host domain and the new HMAC are not equivalent then the login cookie is not valid.

If the login cookie is not valid, then the authentication server 360 sends a new login page to the client computing device 310, denies access to the protected resource, requests additional challenge data (e.g., presents security questions and/or perform step up authentication), or any combination thereof.

If the login cookie is valid, then the authentication server 360 performs a deep analysis (e.g., risk-based analysis) based on the login cookie, the limited-distribution cookie, the verification data transmitted with the request, or any combination thereof. The risk-based analysis can also be based on historic values, the time the login cookie was created, the time the limited-distribution cookie was created, or any combination thereof. The risk-based analysis can produce a risk score (e.g., confidence level that the user is legitimate). The risk score can be compared against a pre-defined threshold to decide if the risk is too high to allow the requestor access to the protected resource.

If the deep analysis of the authentication server 360 passes, then the authentication server 360 regenerates the login cookie, adding new verification data to the login cookie, and transmits the updated login cookie to the client computing device 310 via the internet 320, instructing the client computing device 310 to retry entry to the protected resource.

If the deep analysis of the authentication server 360 fails, then either access to the first application server 370 is denied, the authentication server 360 requests additional challenge data (e.g., presents security questions and/or perform step up authentication), and/or the authentication server 360 transmits a new login page to the IP address in the request, which should be the IP address of the client computing device 310 if the sender of the login cookie is the legitimate user. In the case where the login cookie was stolen, the transmission by the authentication server 360 of the new login page to the IP address in the request results in the login page being presented to the illegitimate user. The illegitimate user does not likely have the login credentials, and thus, in this manner the authentication server 360 prevents the illegitimate user from gaining access to the first application server 370.

Figure 4:
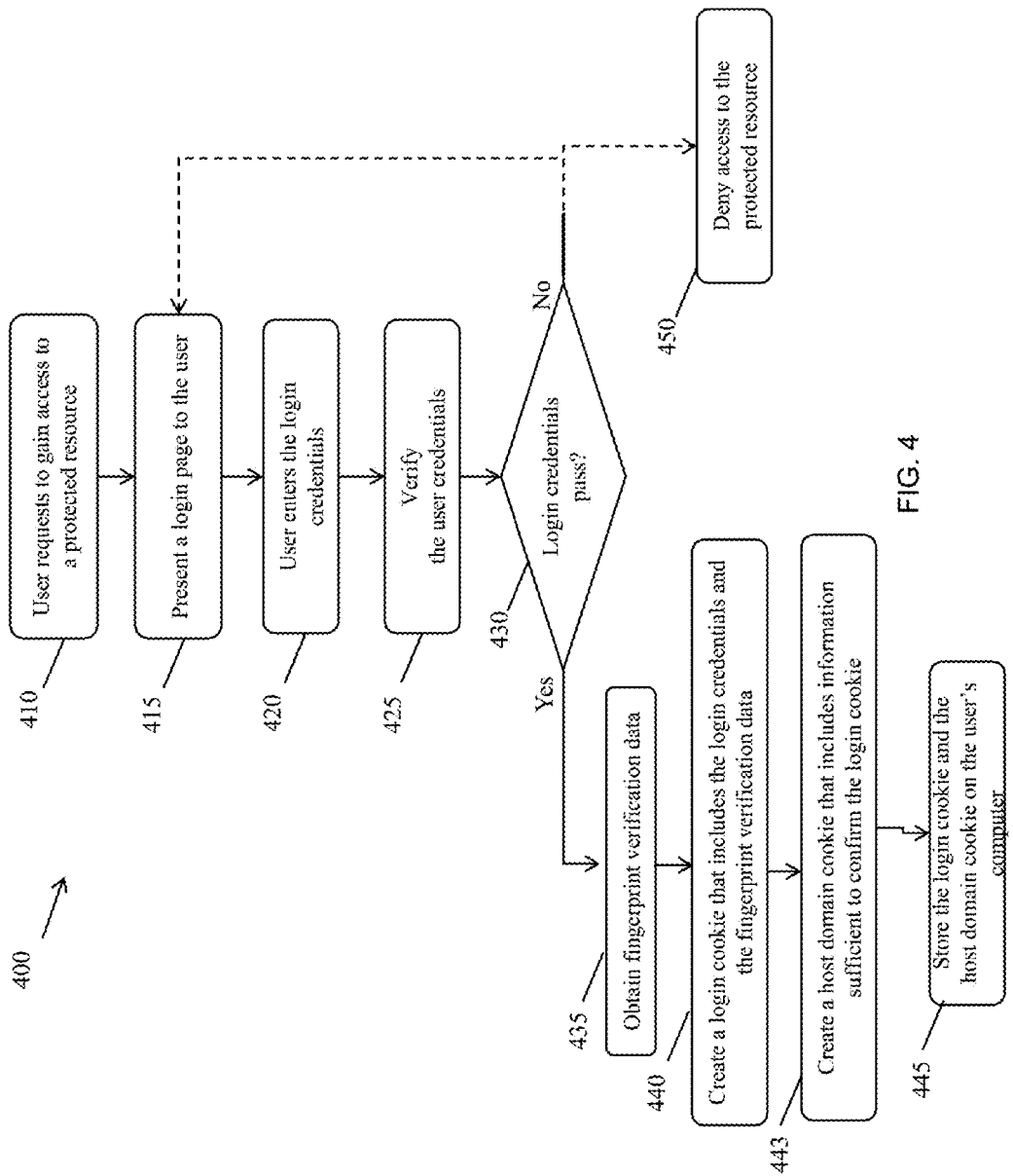
FIG. 4 is a flow diagram of a method of validation of a client user in a secured network, according to an illustrative embodiment of the invention.

FIG. 4 is a flow diagram 400 of a method of validation of a client user in a secured network, according to an illustrative embodiment of the invention.

The method involves a user requesting to gain access to a protected resource (Step 410) (e.g., a user inputs the request to the browser 315 of client computing device 310 to gain access to the first application server 370 or the second application server 380, as described above in FIG. 3).

A login page is presented to the user (Step 415) (e.g., authentication server 360 presents the login page, as described above in FIG. 3). The login page allows the user to input login credentials. The user enters the login credentials (Step 420).

The login credentials can include a user name, a password, and/or any information used by a domain to uniquely identify the user. In some embodiments, the login is established through a single-sign-on from another authentication service (e.g., another company).

The user's login credentials are verified (Step 425) (e.g., verification can be performed the authentication server 360, as described above in FIG. 3). The user's login credentials can be verified by checking that the credentials are the correct credentials for the particular application set for the particular server. The user's login credentials can also be verified as is known in the art. If the login credentials fail (Step 430), then access is denied 450 or the login page is re-transmitted to the user to the user (Step 415) (e.g., authentication server 360 retransmits the request, as described above in FIG. 3).

If the login credentials pass (Step 430), then data that is included in the request is obtained from the request (Step 435 (e.g., the authentication server 360 can obtain data from the request, as discussed above in FIG. 3). For example, data can be obtained from the network, or the HTTP layers that transmitted the request. The network data, the HTTP layers and/or device print information can include IP address, time of transmission, geographical location of transmission, user-agent type, screen size, available fonts, software versions or any combination thereof. The data can be referred to as verification data, fingerprint data and/or fingerprint verification data. The data can include items that uniquely identify the client computing device that the user transmitted the request from.

The method also involves creating a login cookie that includes the login credentials and the fingerprint verification data (Step 440) (e.g., the authentication server 360 can create the login cookie, as described above in FIG. 3). The fingerprint verification data can be a subset or derived from data received in the request (e.g., a second set of verification data is a subset of the first set of verification data). Table I is an example of allowed fingerprint definition fields in an exemplary login cookie.

TABLE 1

| ID | NAME |
|---|---|
| 1 | CLIENT IP |
| S | USER AGENT |
| 9 | HTTP PROTOCOL |
| 10 | HTTP QUERY PAYLOAD |

In some embodiments, the method involves specifying (e.g., via the authentication server) a strategy for the login cookie, in other words, identify which fields of the available fields are to be included in the login cookie and/or should be used during the first level and/or second level review.

In these embodiments, the fingerprint verification data field can be added as follows:

a. Fingerprint status (enabled or disabled) and fingerprint list.
b. Field data can consist of:
<enable/disable><hash size><number of hash><HASH-1><HASH-2> . . .
Where:
<enable/disable>:=1 byte integer, 1 to enable fingerprint checking, 0 to disable
<hash size>:=1 byte integer, size of each hash
<number of hash>:=1 byte integer
<HASH-n>:=series of hash values, of size <hash size>
c. Fingerprint construction strategy.
d. Field data will consist of:
<ID1>,<ID2>, . . .
where <IDn> are IDs or names of client verification information to be included in the fingerprint hash calculation.

In some embodiments, items a and b are required. In some embodiments, items c and d are optional.

The method also involves creating a limited-distribution cookie (Step 443) (e.g., authentication server 360 as described above in FIG. 3). The limited-distribution cookie can include information that is sufficient to confirm the login cookie (e.g., a third set of verification data). For example, the limited-distribution cookie can include a HMAC based on a secret-key and the login cookie.

The method also involves storing the login cookie and the limited-distribution cookie on the user's computing device (Step 445). Storing the cookies on the user's computing device can be done as is currently known in the art.

Figure 5:
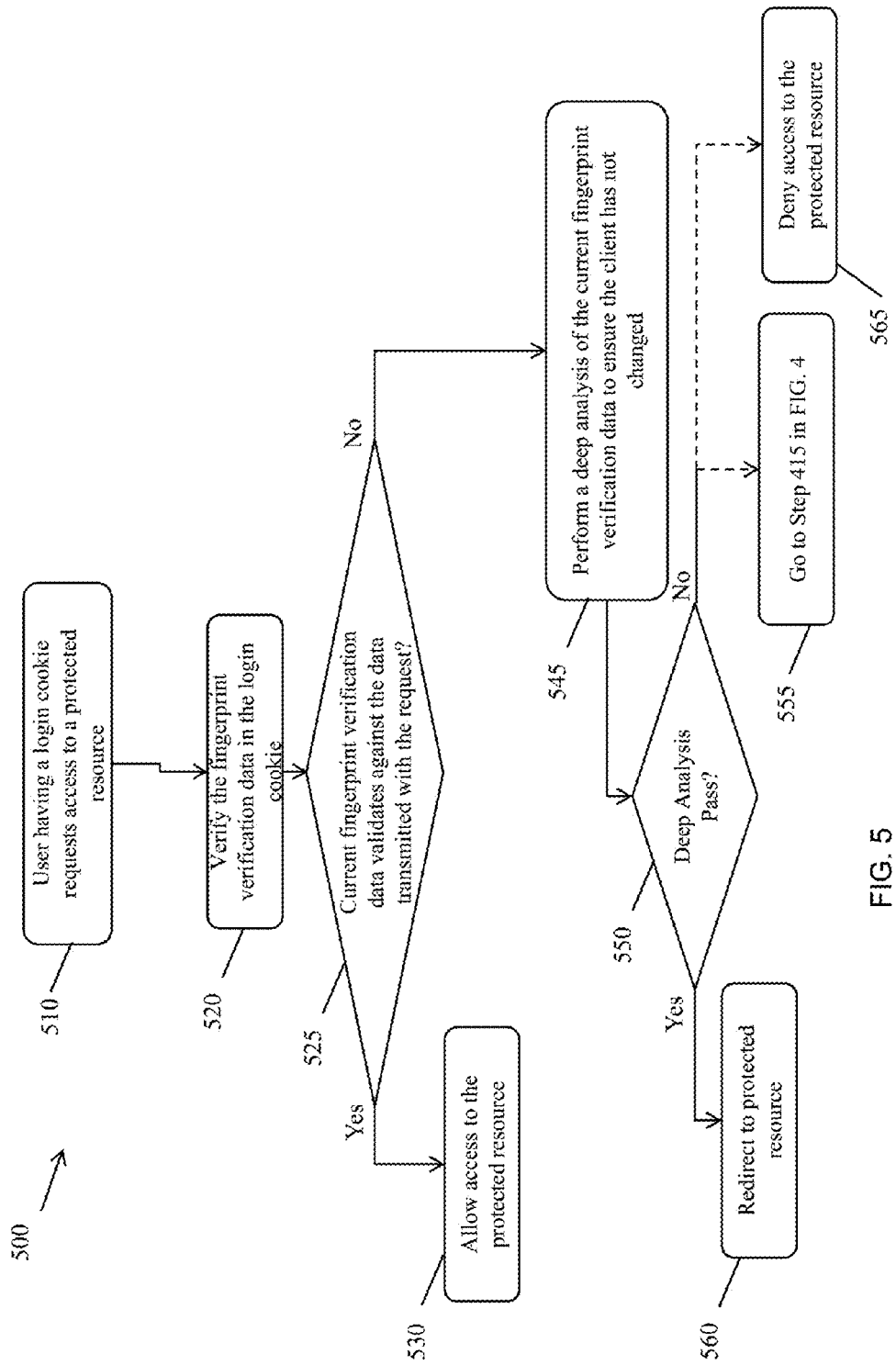
FIG. 5 is a flow diagram of a method of validation of a requestor requesting access to a protected resource in a secured network, according to an illustrative embodiment of the invention.

FIG. 5 is a flow diagram 500 of a method of validation of a client user in a secured network, according to an illustrative embodiment of the invention.

The method involves a user that previously obtained a login cookie requesting access to a protected resource of the same domain (Step 510) (e.g., user can request access to the second application server 380, as described above in FIG. 3).

The fingerprint verification data (e.g., a second set of verification data) in the cookie is compared against data that was transmitted with the request (e.g., a fourth set of verification data) (Step 525). This can be referred to as a first level review. For example, authentication monitor 340 can verify the fingerprint data, as described above in FIG. 3). The IP address in the fingerprint verification data can be compared against the IP address sent with the request (e.g., as can be found in an HTTP header).

In various embodiments, network mac address, http user agent, device print data (screen size, available fonts, software version), or any combination thereof are compared between the login cookie and the data sent with the request.

If the fingerprint verification data item(s) being compared match the data item(s) transmitted in the request, then it is more likely than not that the legitimate user is requestor, and access to the protected resource is granted (Step 530) (e.g., authentication monitor 340 can allow access the first application server 370, as described above in FIG. 3). If the data item(s) do not match, then there is a risk that the requestor is not the user. If an illegitimate user (e.g., hacker) has stolen the login cookie from the legitimate user and transmitted it from his own client computing device, then the data item(s) sent with the request that should be the same or correspond to the data item(s) in the fingerprint verification data will be different. For example, an illegitimate user that has stolen the login cookie will have an IP address transmitted with the request that is different from the IP address that was included as part of the fingerprint verification data at the time the login cookie was created.

In some instances, it is possible that data items in the legitimate user's request have legitimately changed. For example, the legitimate user may have first logged in on a mobile device having a first IP address. The mobile device can be assigned a different IP address, and then when the legitimate user attempts to access a protected resource with the login cookie created at the time of login, the IP address in the request is different in the from the IP address in the login cookie.

If the data item(s) in the request are not the same or sufficiently correspond to the data item(s) in the login cookie, instead of denying access to the protected resources all together, a deep analysis can be performed to determine whether the user is legitimate or not (Step 545) (e.g., deep analysis can be performed by the authentication server 360, as described above in FIG. 3). The deep analysis can be referred to as a second level review.

Figure 6:
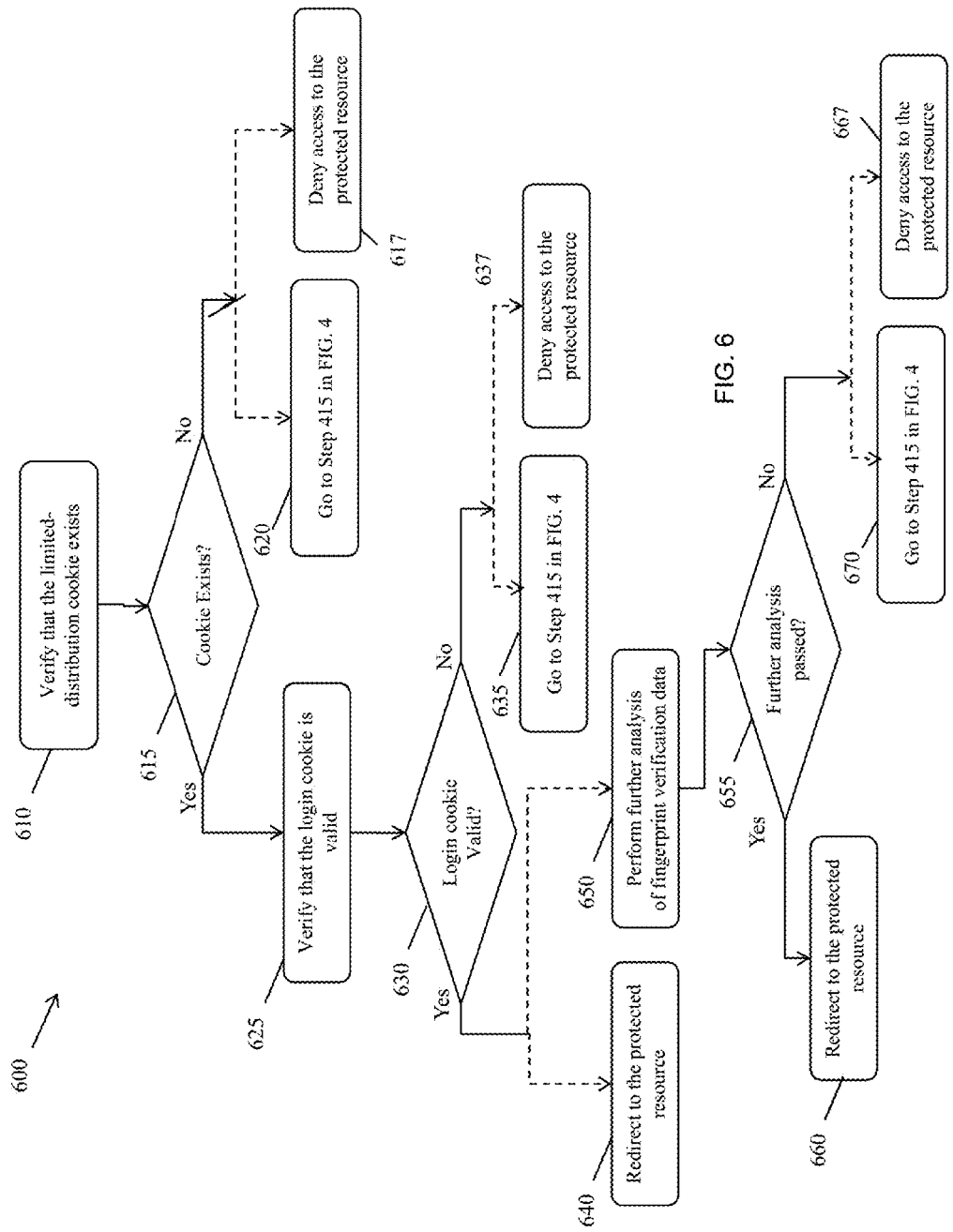
FIG. 6 is a flow diagram of a method of validation of a client user in a secured network that includes a deep analysis of a requestor of the protected resource, according to an illustrative embodiment of the invention.

In some embodiments, the deep analysis is performed by risk based analysis methods as are known in the art. In some embodiments, the deep analysis is performed as shown in FIG. 6 and the accompanying description below. In some embodiments, the deep analysis is not performed and if the first level review fails, then the requestor is denied access to the protected resource.

If the deep analysis passes (Step 550), then the requestor's login cookie can be updated and the requestor is redirected to the protected resource with the updated login cookie (Step 560). If the deep analysis fails (step 550), then the requestor is either denied access (Step 565) or transmitted a login page to start the authentication process again (Step 415).

In some embodiments where the legitimate user's verification data for first level review legitimately changes (e.g., IP address) when the deep analysis finds that the requestor is likely the legitimate user, the login cookie can be modified to include a list of fingerprints, each fingerprint corresponding to each deep level review validated set of verification data. In some embodiments, if the user's fingerprint data changes with each request, the fingerprint check can be suspended.

FIG. 6 is a flow diagram 600 of a method of validation of a client user in a secured network that includes a deep analysis of the client user, according to an illustrative embodiment of the invention.

As described above in FIG. 5, if fingerprint verification fails a first level review, a second level review can be performed. The second level review includes a deep analysis of the fingerprint verification data in the login cookie and the limited-distribution cookie. The deep analysis includes verifying that the limited-distribution cookie exists (Step 610) (e.g., authentication server 360 can verify that the login cookie exists, as described above with respect to FIG. 3). If the limited-distribution cookie does not exist (Step 615) then either access is denied to the protected resource (Step 617) or the login page is presented to the requestor (Step 620).

If the limited-distribution cookie does exist (Step 615), then the method also involves verifying that the login cookie is valid (Step 625) (e.g., authentication server 360 can verify that the login cookie is valid, as described above with respect to FIG. 3). The login cookie can be validated by 1) determining a first value based on a HMAC hash based on the verification data in the login cookie and the secret-key in the limited-distribution cookie, and 2) comparing the first value to a second value based on a HMAC hash based on verification data and the secret-key of the host login cookie that was created at the time the host login cookie was made. If the first value and the second value are equal, then the cookie is valid. If the first value and the second value are not equal, then the cookie is not valid.

If the cookie is not valid (Step 630) then either access is denied to the protected resource (Step 637) or the login page is presented to the requestor (Step 635). In some embodiments a request including additional challenge data is presented (e.g., presents security questions and/or perform step up authentication).

If the cookie is valid (Step 640), then the method also involves either allowing access to the protected resource (Step 640) or performing further analysis of the fingerprint verification data (Step 650). In some embodiments, the further analysis of the fingerprint data includes performing risk based analysis as is known in the art. The risk based analysis is based on the login cookie, the limited-distribution cookie, and data transmitted with the request. The risk based analysis can include verifying that the requestor did not make the request from a distance so far away from the original login request that it would be impossible for the legitimate user to have traveled that far. The risk based analysis can result in a confidence level. The confidence level can be compared against a predefined threshold to decide if the risk it too high for the requestor to continue.

If the further analysis passes (Step 655), then access is allowed to the protected resource. If the further analysis fails (Step 65), then either access is denied to the protected resource (Step 670) or the login page is presented to the requestor (Step 667).

The above-described systems and methods can be implemented in digital electronic circuitry, in computer hardware, firmware, and/or software. The implementation can be as a computer program product (e.g., a computer program tangibly embodied in an information carrier). The implementation can, for example, be in a machine-readable storage device for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by an apparatus and can be implemented as special purpose logic circuitry. The circuitry can, for example, be a FPGA (field programmable gate array) and/or an ASIC (application-specific integrated circuit). Modules, subroutines, and software agents can refer to portions of the computer program, the processor, the special circuitry, software, and/or hardware that implement that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can be operatively coupled to receive data from and/or transfer data to one or more mass storage devices for storing data (e.g., magnetic, magneto-optical disks, or optical disks).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computer having a display device, a transmitting device, and/or a computing device. The display device can be, for example, a cathode ray tube (CRT) and/or a liquid crystal display (LCD) monitor. The interaction with a user can be, for example, a display of information to the user and a keyboard and a pointing device (e.g., a mouse or a trackball) by which the user can provide input to the computer (e.g., interact with a user interface element). Other kinds of devices can be used to provide for interaction with a user. Other devices can be, for example, feedback provided to the user in any form of sensory feedback (e.g., visual feedback, auditory feedback, or tactile feedback). Input from the user can be, for example, received in any form, including acoustic, speech, and/or tactile input.

The computing device can include, for example, a computer, a computer with a browser device, a telephone, an IP phone, a mobile device (e.g., cellular phone, personal digital assistant (PDA) device, laptop computer, electronic mail device), and/or other communication devices. The computing device can be, for example, one or more computer servers. The computer servers can be, for example, part of a server farm. The browser device includes, for example, a computer (e.g., desktop computer, laptop computer, and tablet) with a World Wide Web browser (e.g., Microsoft® Internet Explorer® available from Microsoft Corporation, Chrome available from Google, Mozilla® Firefox available from Mozilla Corporation, Safari available from Apple). The mobile computing device includes, for example, a personal digital assistant (PDA).

Website and/or web pages can be provided, for example, through a network (e.g., Internet) using a web server. The web server can be, for example, a computer with a server module (e.g., Microsoft® Internet Information Services available from Microsoft Corporation, Apache Web Server available from Apache Software Foundation, Apache Tomcat Web Server available from Apache Software Foundation).

The storage module can be, for example, a random access memory (RAM) module, a read only memory (ROM) module, a computer hard drive, a memory card (e.g., universal serial bus (USB) flash drive, a secure digital (SD) flash card), a floppy disk, and/or any other data storage device. Information stored on a storage module can be maintained, for example, in a database (e.g., relational database system, flat database system) and/or any other logical information storage mechanism.

The above-described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by virtue of computer programs running on the respective computers and having a client-server relationship to each other.

The above described networks can be implemented in a packet-based network, a circuit-based network, and/or a combination of a packet-based network and a circuit-based network. Packet-based networks can include, for example, the Internet, a carrier internet protocol (IP) network (e.g., local area network (LAN), wide area network (WAN), campus area network (CAN), metropolitan area network (MAN), home area network (HAN), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, Bluetooth®, code-division multiple access (CDMA) network, time division multiple access (TDMA) network, global system for mobile communications (GSM) network), and/or other circuit-based networks.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. A computerized-method of validating a client user in a secured network, the method comprising:

receiving, by a first server computing device, a first request from a client to login to a protected domain of the first server, the first request including user login credentials and a first set of verification data, the first set of verification data recorded by the client at the time the login credentials were entered;

determining, by the first server computing device, whether the login credentials are recognized;

transmitting, by the first server computing device, a first cookie to the client, the first cookie including the login credentials and a second set of verification data, the second set of verification is a subset or derived from the first set of verification data;

transmitting, by the first server computing device, a second cookie to the client, the second cookie including a third set of verification data that is sufficient to confirm the first cookie;

receiving, by a second server computing device, a request to gain access to a protected resource of the protected domain, the second request including the first cookie and a fourth set of verification data;

determining, by the server computing device, whether the request was transmitted by the client associated with the first cookie based on the first cookie and the fourth set of verification data;

wherein determining whether the request was transmitted by the client associated with the first cookie further comprises:

determining, by the second server computing device, whether the first cookie passes a first level review; and if the first cookie does not pass a first level review, then:
redirecting, by the second server computing device, the client to the first server computing device;
detecting, by the first server computing device, the second cookie is received from the client;
determining, by the first server computing device, whether the first cookie passes a second level review based on the first cookie and the second cookie;

if the request was transmitted by the client associated with the first cookie, allowing access to the protected resource of the protected domain; and if the request was not transmitted by the client associated with the first cookie, denying access to the protected resource of the protected domain or redirect the user to reenter login credentials.

2. The computerized-method of claim 1 wherein determining whether the request was transmitted by the client associated with the first cookie further comprises:

determining, by the second server computing device, whether a first IP address included in the second set of verification data in the cookie is equal to a second IP address included in the fourth set of verification data transmitted with the second request.

3. The computerized-method of claim 2 wherein determining whether the request was transmitted by the client associated with the first cookie further comprises:

determining, by the first server computing device, a first value to include in the first cookie, the first value is determined by performing a cryptographic hash on the at least a portion of the second set of verification data;

determining, by the second server, a second value, the second value is determined by performing a cryptographic hash on a subset of the fourth set of verification data, the subset of the fourth set of verification data based on fields present in the second set of verification data; and comparing, by the second server, the first value and the second value.

4. The computerized-method of claim 1 wherein the first level review comprises determining, by the first server computing device, whether a first location included in the second set of verification data is equal to a second location included in the fourth set of verification data.

5. The computerized-method of claim 4 wherein the first level review comprises determining, by the second server computing device, a time lapse between the second set of verification data and the fourth set of verification data.

6. The computerized-method of claim 1 wherein the second set of verification data is derived by performing a cryptographic hash on at least a portion of the first set of verification data.

7. The computerized-method of claim 1 wherein the fields to include from the first set of verification in the second set of verification data is specified in a file.

8. The computerized-method of claim 1 wherein the second set of verification data includes one or more of IP address, user agent, screen size, available fonts, and software version.

9. The computerized-method of claim 1 wherein the third set of verification data includes an encryption key and the first set of verification data encrypted with the encryption key.

10. The computerized-method of claim 1 wherein the fourth set of verification data is based on an indicator in the first cookie, the indicator specifies data fields that are present in the second set of verification data.

11. The computerized-method of claim 1 wherein the fourth set of verification data includes one or more of IP address, user agent, screen size, available fonts, and software version.

* * * * *